(12) United States Patent
Darst (10) Patent No.: US 7,523,996 B1
(45) Date of Patent: Apr. 28, 2009

(54) AUGER CAR BEARING SUPPORT

(75) Inventor: Robert Darst, Louisville, KY (US)

(73) Assignee: Republic Industries International, Inc, Louisville, KY (US)

( * ) Notice: Subject to any disclaimer, the term of this patent is extended or adjusted under 35 U.S.C. 154(b) by 217 days.

(21) Appl. No.: 11/622,173

(22) Filed: Jan. 11, 2007

Related U.S. Application Data (63) Continuation-in-part of application No. 11/259,465, filed on Oct. 26, 2005, now Pat. No. 7,461,902.

(51) Int. Cl.
*E21C 25/00* (2006.01)
*F16C 25/04* (2006.01)

(52) U.S. Cl. .......................... 299/67; 384/213

(58) Field of Classification Search .............. 299/67; 384/206, 208, 209, 211, 212, 213
See application file for complete search history.

(56) References Cited

U.S. PATENT DOCUMENTS

| | | | |
|---|---|---|---|
| 1,183,200 A | 5/1916 | Holy | |
| 3,312,361 A | 4/1967 | Foster | |
| 3,762,786 A | 10/1973 | Bailey et al. | |
| 4,619,579 A | 10/1986 | Frison | |
| 4,765,757 A | 8/1988 | Hartl | |
| 5,064,338 A | 11/1991 | Lawrence | |
| 5,564,885 A | 10/1996 | Staben, Jr. | |
| 6,425,212 B1 | 7/2002 | Lovazzano | |

OTHER PUBLICATIONS

Split spherical bearings solve the downtime dilemma, Rock Products, Aug. 2000.
Oberg, Erik, Machinery's Handbook, 2000, pp. 2197-2203.

*Primary Examiner*—John Kreck
(74) *Attorney, Agent, or Firm*—Camoriano and Associates; Theresa Fritz Camoriano (57) ABSTRACT

An auger shaft bearing support includes a multi-part inner bearing, a multi-part outer bearing, and a multi-part housing. The inner bearing is secured to the auger shaft and rotates with the auger shaft. The inner bearing has an outer surface that is received in the outer bearing.

13 Claims, 11 Drawing Sheets

AUGER CAR BEARING SUPPORT

This application claims priority from and is a continuation-in-part of U.S. application Ser. No. 11/259,465, filed Oct. 26, 2005 now U.S. Pat. No. 7,461,902.

BACKGROUND

The present invention relates to an auger car bearing support. In high wall mining, a mining car is fed into the wall of the mine to remove the coal. The front mining car has a pair of bits and is driven by a separate drive module, which mounts to the rear of the bits to drive them. The front car (or lead car) chews up the coal, and then, as it travels into the wall, the drive module is removed, auger cars are attached to the back of the lead car, and the drive module is attached to the back of the rear auger car, driving the rear augers, which, in turn, drive the other augers and the bits. As the bits chew up the coal, they feed the coal onto the augers, which then carry the coal out of the mine. There has been a big problem with the bearing supports for the auger shafts wearing out very quickly, typically in 2 to 4 weeks of operation. This also damages the auger shaft itself, requiring repair and replacement of the auger shaft. The repairs are expensive, and they delay the mining operation, resulting in lost profits. Thus, it would be very helpful to provide a more reliable support for the augers which lasts longer and does not damage the augers.

SUMMARY

One embodiment provides a two-piece, spherical, heat treated, low alloy steel inner bearing welded to the auger shaft. This inner bearing rotates inside a two-piece, spinodal bronze outer bearing which is kept from rotation within a bearing housing via bearing cap bolts. The bearing housing incorporates a lubrication passage which extends through the outer bearing so as to lubricate the spherical surfaces between the inner and outer bearings. This lubrication passage permits the lubrication of the bearing without disassembly.

The two-piece design of the inner and outer bearings, as well as of the bearing housing, facilitates assembly and repair, as well as retrofitting of existing installations. The outer bearing includes a series of labyrinth seal grooves which retain the lubricant and help keep contaminants out of the bearing.

In one embodiment, the inner bearing is flash chrome plated to increase its hardness to approximately 60 C in the Rockwell hardness scale. Additionally, the surface of the inner bearing surface may be polymer-coated to seal any pores or micro-cavities. The outer, spinodal bronze bearing has a hardness of approximately 30 C Rockwell, such that, in case of any wear between the two bearings, the outer bearing will wear first, before the inner bearing wears. Replacing the outer bearing is much easier than replacing the inner bearing, since the inner bearing is secured, as by welding, to the auger shaft. By the same token, the lubrication grooves are located on the inner bearing such that the grooves (and therefore lubrication) will not be adversely affected even if the outer bearing wears.

In another embodiment, the inner bearing includes prominent thrust faces to improve the capability of the bearing to handle high thrust loads. In one version, there is a larger thrust face in the direction of the larger expected thrust load, resulting in a radially-asymmetrical bearing. This feature allows for the maximization of the axial bearing surface within the physical confines of the dimensions of the bearing while optimizing the radial bearing surface so as to handle the expected thrust loads. This feature additionally allows for the automatic centering of the outer bearing relative to the inner bearing.

DESCRIPTION

Figure 1A:
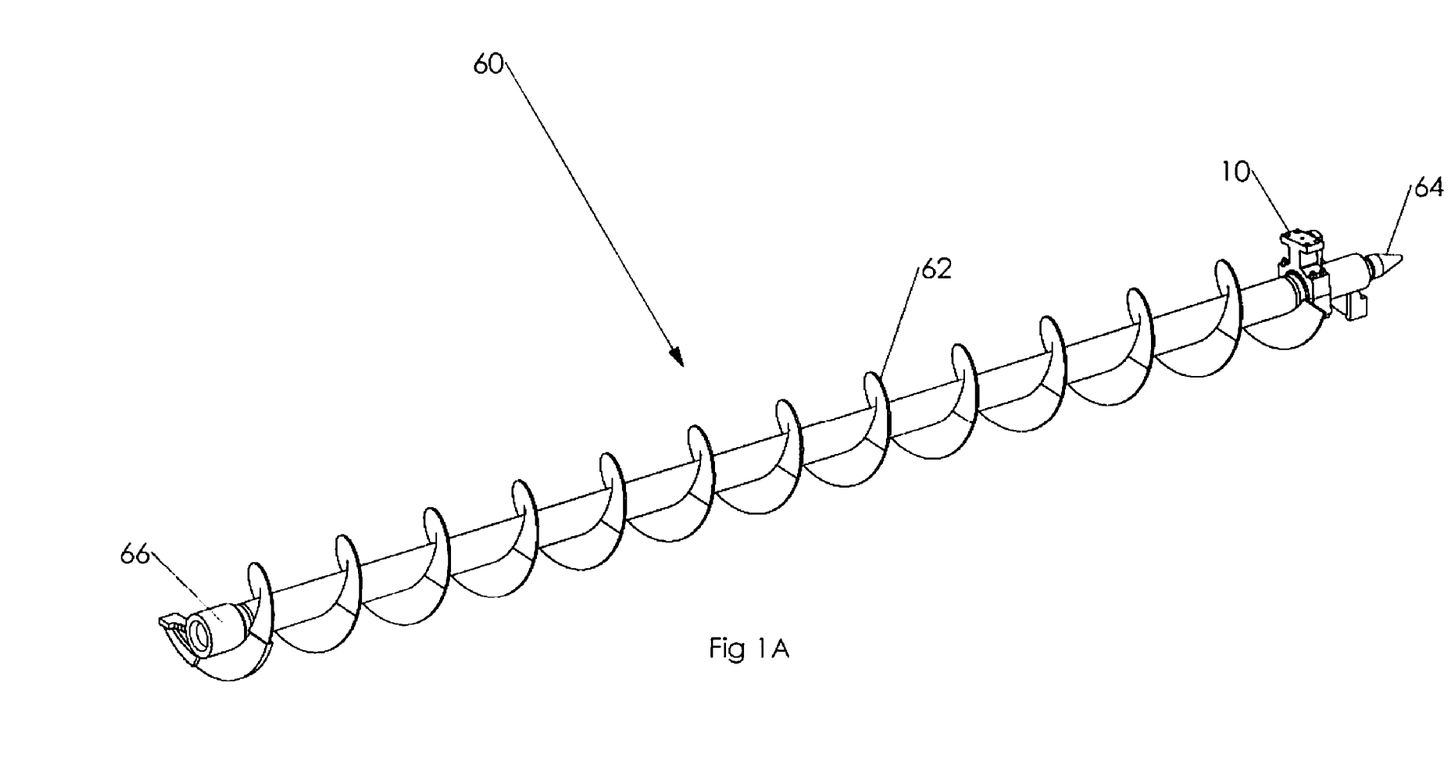
FIG. 1A is a perspective view of an auger shaft including an auger shaft bearing support made in accordance with the present invention.
Figure 1B:
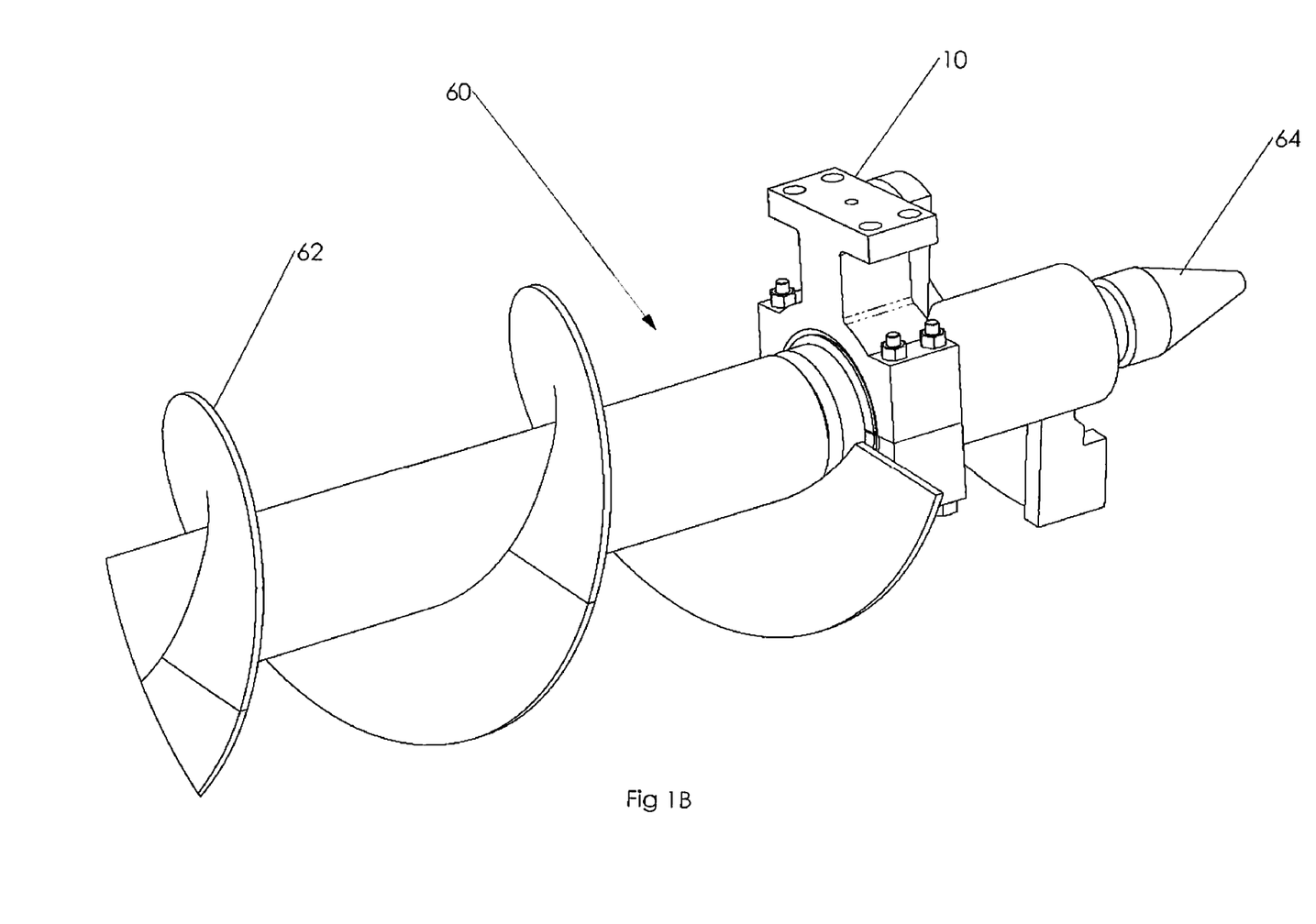
FIG. 1B is a broken-away, enlarged view of one end of the auger shaft of FIG. 1A.
Figure 1C:
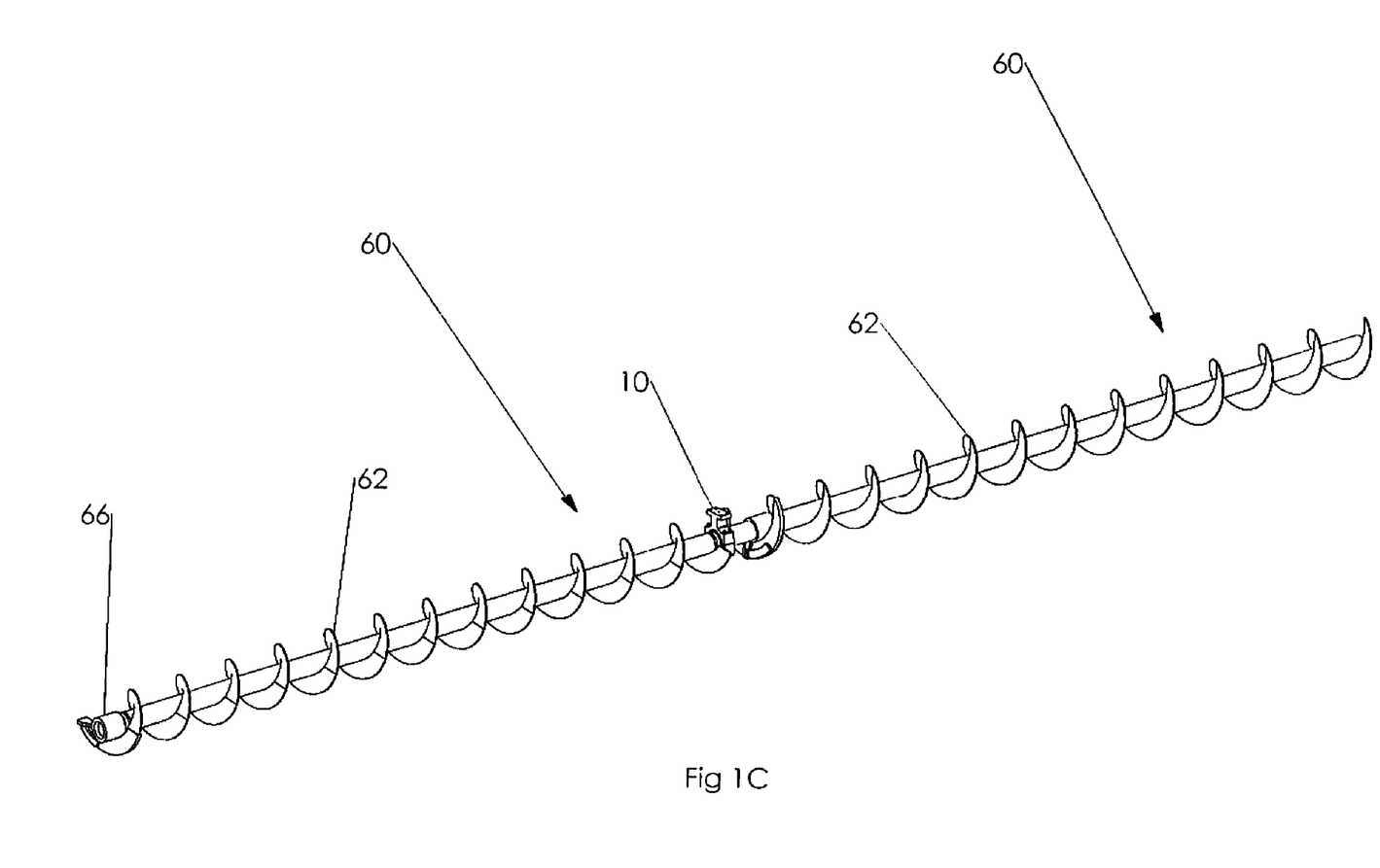
FIG. 1C is a perspective view of two auger shafts of FIG. 1A connected together.

FIGS. 1A-1D show an auger shaft 60, including an auger shaft bearing support 10 made in accordance with the present invention. The auger shaft 60 is an elongated tubular element defining a screw 62 along its outer surface, a male connector 64 at its first end, and a female connector 66 at its second end. The male connector 64 of one auger shaft 60 engages the female connector 66 of an adjacent, identical auger shaft 60 (as seen in FIG. 1C) in order to form a continuous, multi-part auger shaft which may be made up of several individual auger shafts 60.

In a typical auger car 68 (See FIG. 1D) two auger shafts 60 are placed in a substantially parallel arrangement extending horizontally from the front of the auger car 68 to the rear of the auger car 68, with an auger shaft bearing support 10 mounted to the inside of the structure of the auger car 68 to secure and rotationally support each auger shaft 10 on the auger car 68. An enlarged detail of an auger shaft bearing support 10 mounted onto the auger shaft 60 is shown in FIG. 1B.

Figure 3:
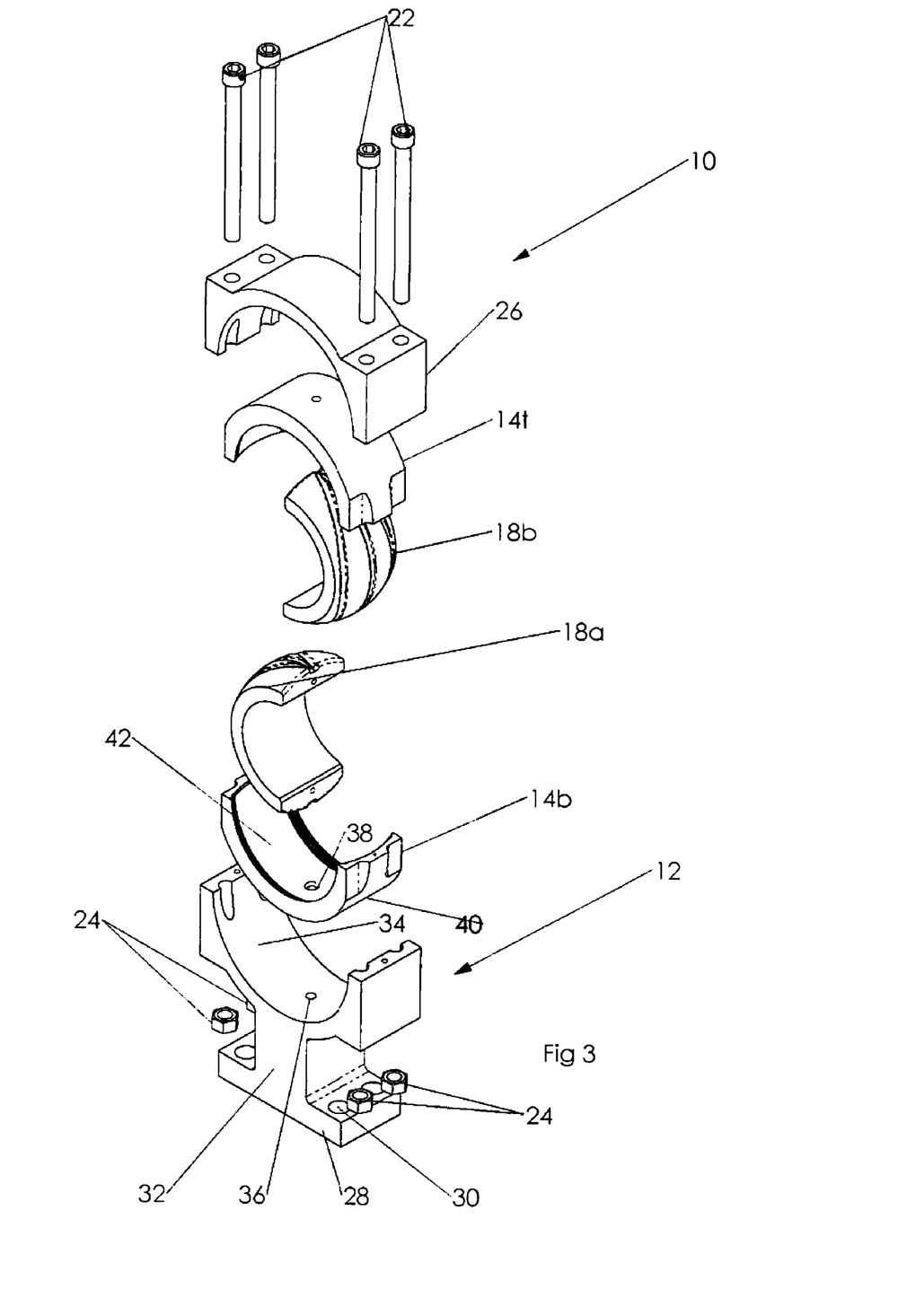
FIG. 3 is an exploded, perspective view of the auger shaft bearing support of FIG. 2A.

The auger shaft bearing support 10 includes a bearing pedestal 12, which defines a plurality of through holes 30 through which bolts (not shown) pass in order to secure the bearing support 10 to the structure of the auger car 68. It also includes an axially split outer bearing including a lower-half outer bearing 14b and an upper-half outer bearing 14t, and an axially split inner bearing including a left-half inner bearing 18a, and a right-half inner bearing 18b. It also includes cap bolts 22, cap bolt nuts 24, and a pedestal cover 26. As discussed in more detail below, the lower and upper outer bearing halves 14b, 14t are identical, and together they complete the outer bearing assembly 14. Similarly, the left and right inner bearing halves 18a, 18b are also identical, and together they complete the inner bearing assembly 18. The inner and outer bearings 18, 14 are thus each axially split into two identical halves 18a, 18b and 14b, 14t respectively. Note that the designations of upper, lower, left and right are for reference only and do not necessarily reflect the positions of the items in actual operation.

Figure 1D:
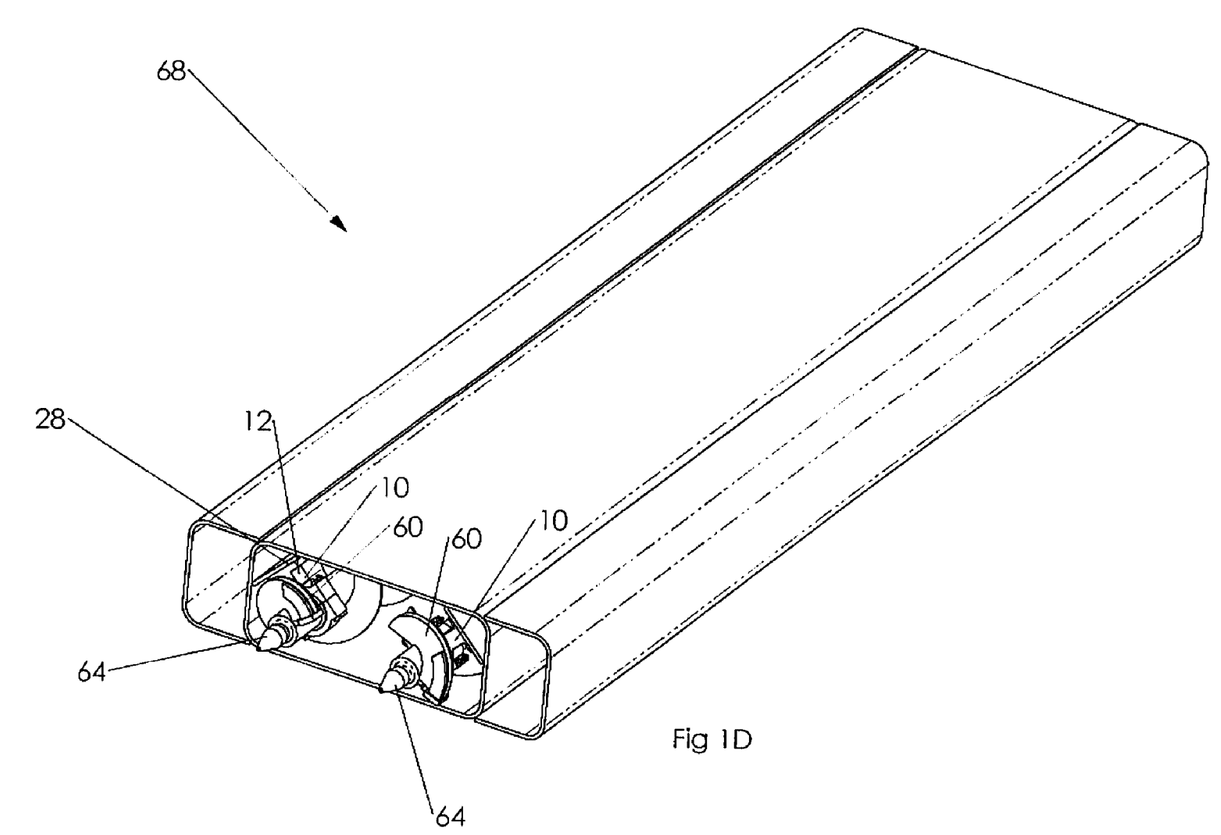
FIG. 1D is a perspective, schematic view of an auger car, including two parallel auger shafts of the type shown in FIG. 1A.
Figure 2A:
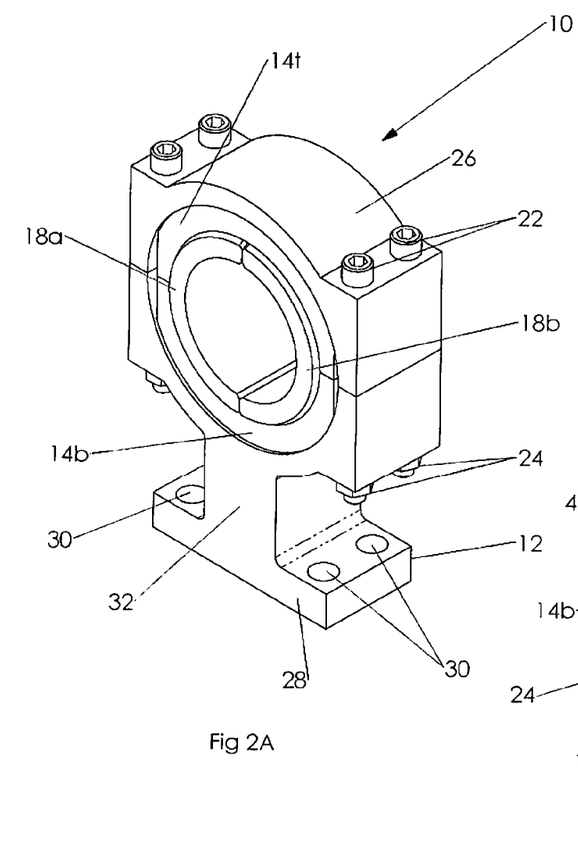
FIG. 2A is a perspective view of the auger shaft bearing support of FIG. 1A.
Figure 2B:
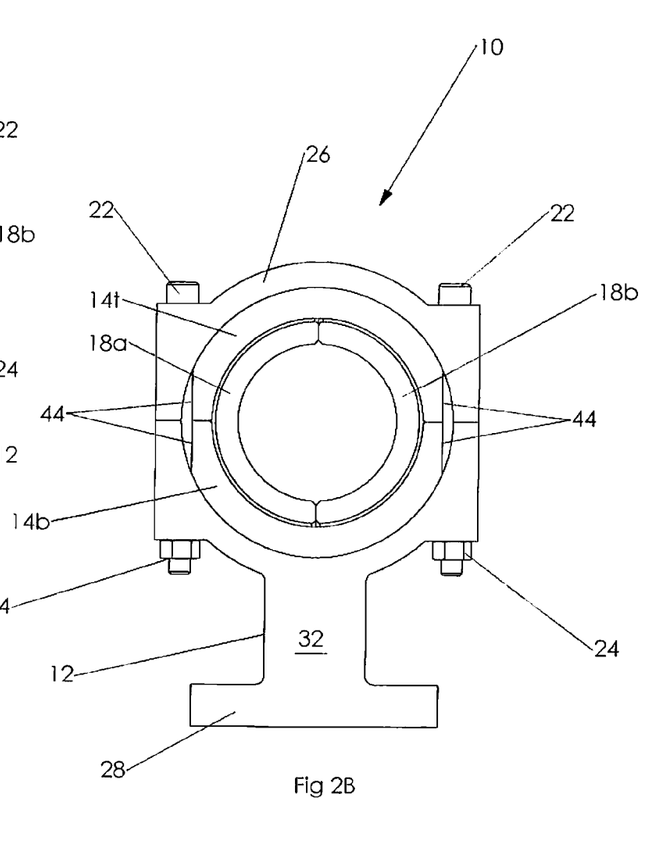
FIG. 2B is an end view of the auger shaft bearing support of FIG. 2A.
Figures 4, 5, 6:
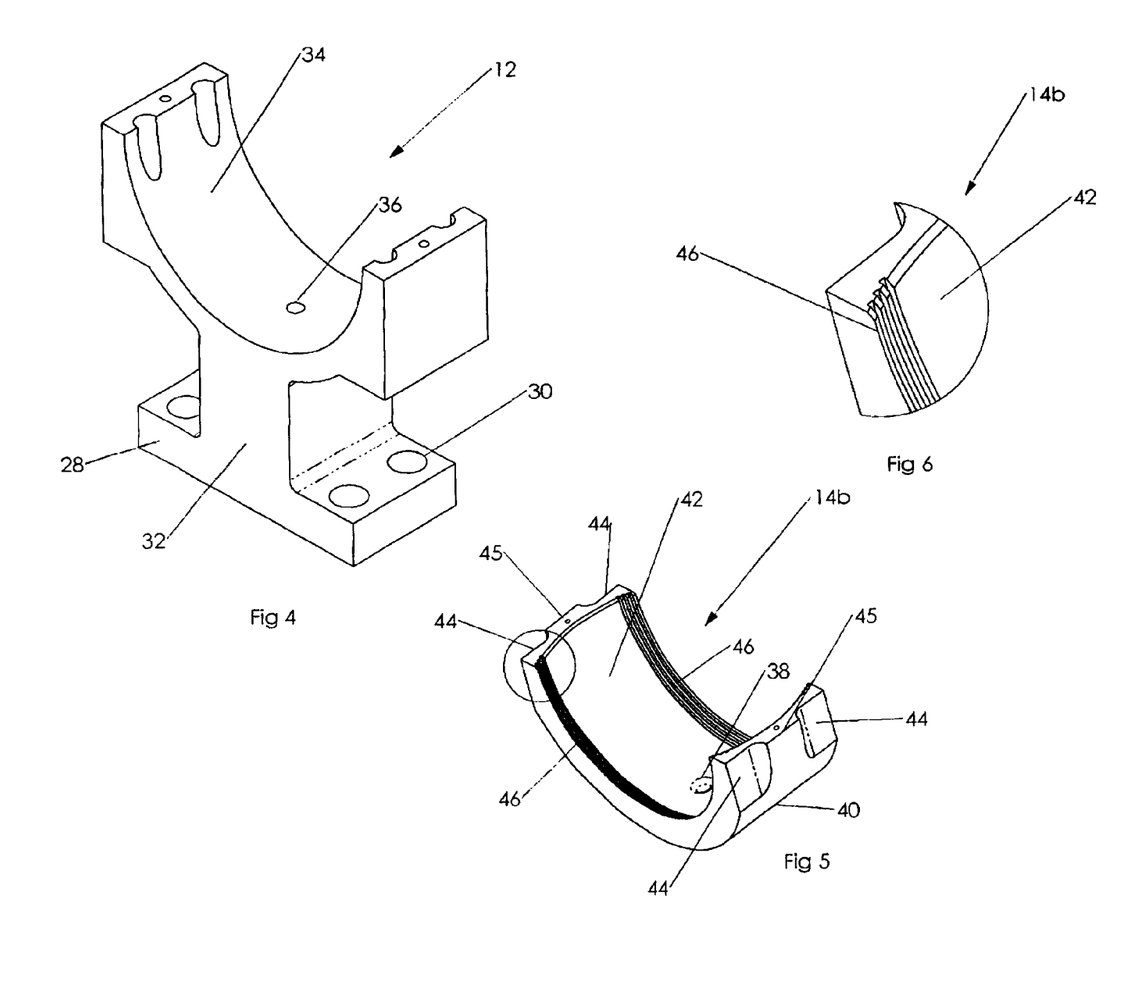
FIG. 4 is a perspective view of the pedestal bearing support of FIG. 3.
FIG. 5 is a perspective view of one half of the outer bearing of FIG. 3.
FIG. 6 is an enlarged, detailed view of the labyrinth seal grooves of the outer bearing of FIG. 5 (See detail "D" in FIG. 3)

Referring to FIG. 4, the bearing pedestal 12 includes a flat base 28 defining the through holes 30 for securing the base 28 to the auger car 68 (See FIG. 1D). Each auger car 68 contains two parallel auger shafts 60, and each auger shaft 60 has one bearing support 10 mounted near one end of the auger car 68. A vertically-extending web 32 projects from the flat base 28, and this web 32 supports a semi-cylindrical saddle 34 which, in turn, supports the inner and outer bearings 18, 14 respectively, as well as the pedestal cover 26 when the auger shaft bearing support 10 is assembled.

A long, through opening 36 extends from the saddle 34 through the web 32 and out through the base 28. As will be described in more detail later, this through opening 36 (also referred to as a lubrication passage 36) may be used to inject lubricant from outside of the auger shaft bearing support 10 to the interface between the inner and outer bearing assemblies 18, 14. It should be noted that one end of the lubrication passage 36 emerges at the axis of symmetry of the saddle 34 for ease in matching up and aligning with a corresponding through opening 38 (See FIG. 5) in the lower-half outer bearing 14b (Even though this is a convenient location for the lubrication passage 36, it could be located elsewhere as long as the corresponding through opening 38 in the outer bearing 14 lines up with it). The other end of the lubrication passage 36 may emerge at any point on the external surface of the bearing pedestal 12 where it is convenient to reach for injecting the lubricant into the auger shaft bearing support 10. Though not illustrated, it is possible for the pedestal cover 26 also to have a similar through opening to be able to inject lubricant through the cover 26, if this is a more accessible location.

Referring to FIG. 5, the lower-half outer bearing 14b defines a semi-cylindrical outer surface 40 (which rests on the semi-cylindrical saddle 34 of the bearing pedestal 12), and a partial reverse-spherical inner surface 42 upon which the partial spherical inner bearing 18 rotates, as discussed in more detail below. The lower-half outer bearing 14b defines a through opening 38, located so as to align with the lubrication passage 36 in the bearing pedestal 12 such that lubricant may be injected from outside of the auger shaft bearing support 10 and reach through the lubrication passage 36 in the bearing pedestal 12 and through the through opening 38 in the lower-half outer bearing 14b.

The lower-half outer bearing 14b also defines flats 44 to prevent rotation of the outer bearing 14 as explained herein. The cap bolts 22 press against these flats 44 to lock the outer bearing 14 between the bearing pedestal 12 and its cover 26, and to prevent rotation of the outer bearing 14. Of course, other mechanisms could be used to prevent rotation of the outer bearing 14 relative to the housing, including pinning or bolting the outer bearing to the housing. It should be noted that, between the flats 44, there is a projection 45 such that, when assembled, the cap bolts 22 straddle the projection 45. However, there is a clearance between the cap bolts 22 and the projection 45 which allows some axial movement of the entire outer bearing 14, inner bearing 18, and auger shaft 60 assembly relative to the pedestal 12. In this preferred embodiment, this axial movement is on the order of ⅛" in each direction (fore and aft) for a total allowable axial movement of approximately ¼". This feature allows for the slight length variations of the augers and the auger housings.

Finally, the edges of the interior surface of the lower-half outer bearing 14b define a plurality of parallel labyrinth seal grooves 46 (See FIG. 6) which retain the lubricant and help keep contaminants out of the bearing surfaces. A labyrinth seal is a non-contacting circumferential seal utilizing a tortuous path for flow of lubricant between the stationary and rotating parts. The design utilizes a series of pressure drops to reduce the leakage. In this instance, the stationary part is the outer bearing 14 and the rotating part is the inner bearing 18, and the series of grooves 46 form the tortuous path for flow, which tends to keep the lubricant inside the auger shaft bearing support 10, and the contaminants outside.

The lower-half outer bearing 14b and the upper-half outer bearing 14t are identical, each terminating along a horizontal planar surface. When those horizontal planar surfaces are joined together, they from the outer bearing 14 which, in a preferred embodiment, is made from spinodal bronze with a Rockwell hardness of between 28 C and 32 C. Spinodal bronze is a high strength copper alloy. The strength comes from the spinodal structure, which is an ordered arrangement of the nickel and tin atoms in waves only millionths of an inch in length.

Figures 7, 8:
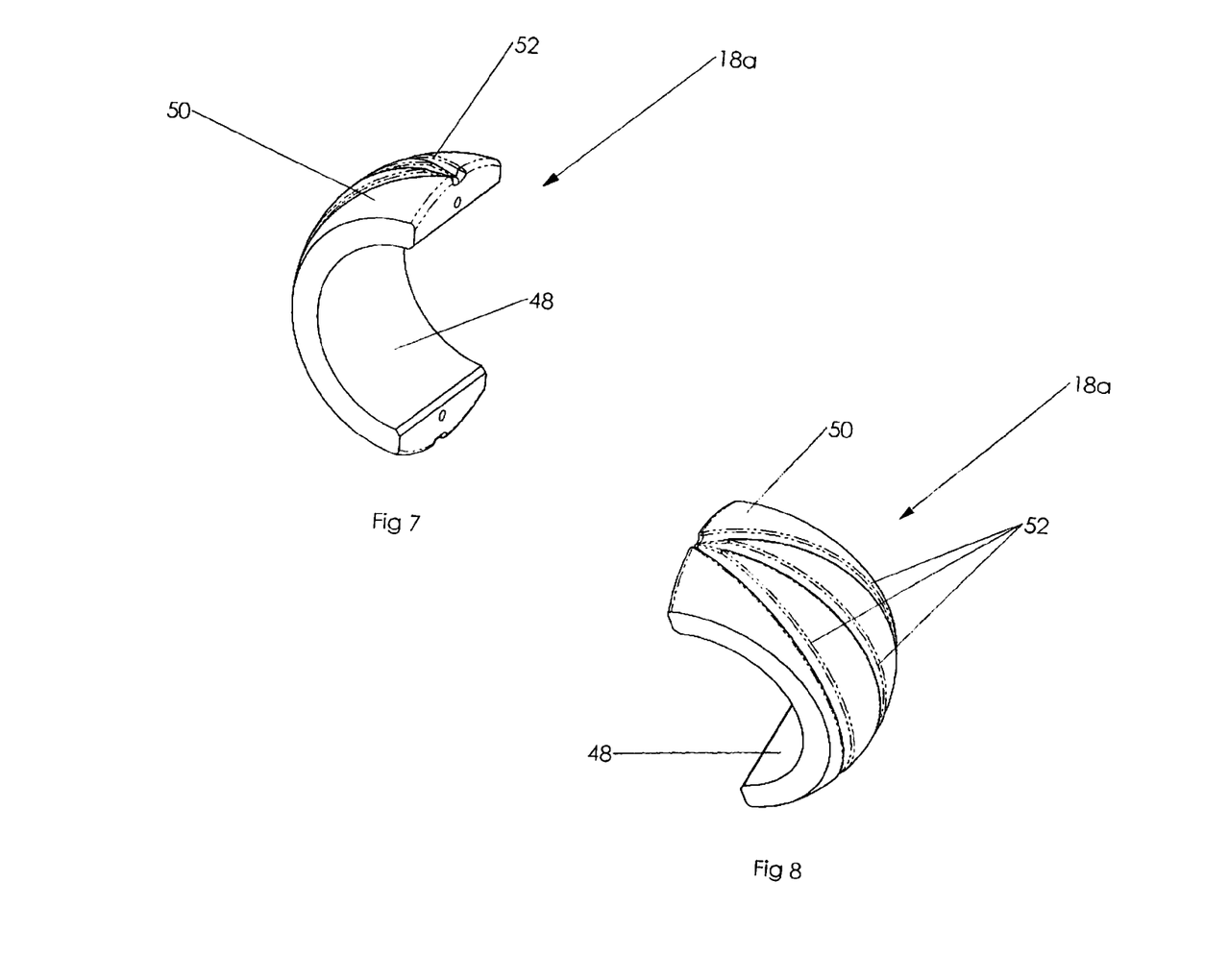
FIG. 7 is a perspective view of one half of the inner bearing of FIG. 3.
FIG. 8 is an opposite-end perspective view of the inner bearing of FIG. 7, highlighting the lubrication grooves.

Referring now to FIGS. 7 and 8, the left-half inner bearing 18a defines a semi-cylindrical inner surface 48 (which wraps around and is welded to the rotating shaft 60), and a partial spherical outer surface 50 which rotates against the similarly shaped reverse-spherical inner surface 42 of the outer bearing 14.

The partial spherical outer surface 50 defines a plurality of lubrication grooves 52 which are aligned with, and/or are in fluid communication with, the through opening 38 in the outer bearing 14. The lubricant which is injected through the lubrication passage 36 passes through the through opening 38 in the outer bearing 14 and onto the central lubrication groove 52. The lubricant travels via the lubrication grooves 52 to effectively lubricate the interface between the reverse-spherical inner surface 42 of the outer bearing 14 and the partial spherical outer surface 50 of the inner bearing 18.

The left-half inner bearing 18a and the right-half inner bearing 18b are identical, each terminating in a planar surface. When the planar surfaces are joined together, they form the inner bearing 18 which, in one preferred embodiment, is made from a heat treated, low alloy steel. The inner bearing 18 may be flash chrome plated to increase its hardness to approximately 60 C in the Rockwell hardness scale. Additionally, the outer surface 50 of the inner bearing 18 may be polymer-coated to seal any pores or micro-cavities.

Since the inner bearing 18 is made from a harder material than the outer bearing 14 (generally 50 C Rockwell hardness or greater compared with approximately 30 C for the outer bearing 14), if there is any wear between the inner and outer bearings 18, 14, the outer bearing 14 will wear first, before any significant wear occurs on the inner bearing 18. The lubrication grooves 52 are on the outer surface 50 of the inner bearing 18 such that the grooves 52 will not be affected even if the outer bearing 14 wears.

The auger shaft bearing support 10 may be assembled to the auger shaft 60 in the following manner: The left-half and right-half inner bearings 18a, 18b are welded or otherwise secured to the shaft 60, such that, as the shaft 60 rotates, the inner bearing 18 rotates with it. The two-piece design of the inner bearing 18 facilitates the mounting of the inner bearing 18 to the shaft 60 without having to disassemble or remove any items mounted to the ends 64, 66 of the shaft 60 (such as additional shafts 60). The flat, planar ends of the inner bearing halves 18a, 18b are aligned along a diameter of the cylindrical auger shaft 60.

The lower-half outer bearing 14b is placed on the bearing pedestal 12, and these two items 12, 14b are placed under the shaft-mounted inner bearing 18. The pedestal 12 may then be bolted to the frame of the auger car 68 using bolts (not shown) which go through the holes 30 in the pedestal 12. The upper-half outer bearing 14t is then placed over the inner bearing 18 and abutting the lower-half outer bearing 14b. The pedestal cover 26 is then placed over the upper half outer bearing 14t, and the entire assembly is secured with the cap bolts 22 and the corresponding nuts 24. The cap bolts 22 press against the flats 44 of the outer bearing 14 to keep this outer bearing 14 within the auger shaft bearing support 10 and to prevent the rotation of the outer bearing 14.

The partial reverse-spherical inner surface 42 of the outer bearing 14 secures the similarly shaped partial spherical outer surface 50 of the inner bearing 18. These partial spherical surfaces also allow for some misalignment of the auger shaft 60 relative to its bearing support 10, and provide support for thrust forces acting axially along the shaft 60.

As in the case of the inner bearing 18, the two-piece design of the outer bearing 14 also allows the quick and easy removal and installation of the outer bearing 14 without having to disassemble or remove any items mounted to the ends of the shaft 60. Since the outer bearing 14 is made from a softer material than the inner bearing 18, this outer bearing 18 is more likely to wear before the inner bearing 18 exhibits any wear. In this event, it is a very simple and inexpensive matter to remove the cap bolts 22, remove the pedestal cover 26, and remove the upper-half outer bearing 14t. The lower-half outer bearing 14b may now also be removed by rotating it around the inner bearing 18 until the lower-half outer bearing 14b pops out. After a quick inspection and cleaning of the parts, new upper-half and lower-half outer bearings 14t, 14b may be installed following the opposite sequence described above for the disassembly of the auger shaft bearing support 10.

Lubricant is added via the lubrication passage 36, and the unit may be placed back in service. The grooves 46 act as a labyrinth seal to help keep the lubricant inside the auger shaft bearing support 10 and to keep contaminants out.

FIGS. 9-14 illustrate another embodiment of an auger shaft bearing support 10' made in accordance with the present invention. This auger shaft bearing support 10' is similar to the auger shaft bearing support 10 described above, and includes a bearing pedestal 12', which defines a plurality of through holes 30' through which bolts (not shown) pass in order to secure the bearing support 10' to the structure of the auger car 68. It also includes an axially split outer bearing including a lower-half (or bottom half) outer bearing 14b' and an upper-half (or top half) outer bearing 14t', and an axially split inner bearing including a upper-half inner bearing 18a', and a lower-half inner bearing 18b'. It also includes cap bolts 22', cap bolt nuts 24', and a pedestal cover 26'. Unlike the previous embodiment, this embodiment 10' also includes assembly bolts 70', and spacers 72'. Also, the physical shape of the inner bearing halves 18a', 18b', the outer bearing halves 14b', 14t', the pedestal 12', and the cover 26' differ from those described earlier, as explained below. Again, note that the designations of upper and lower (or top and bottom) are for reference only and do not necessarily reflect the positions of the items in actual operation.

Figure 9:
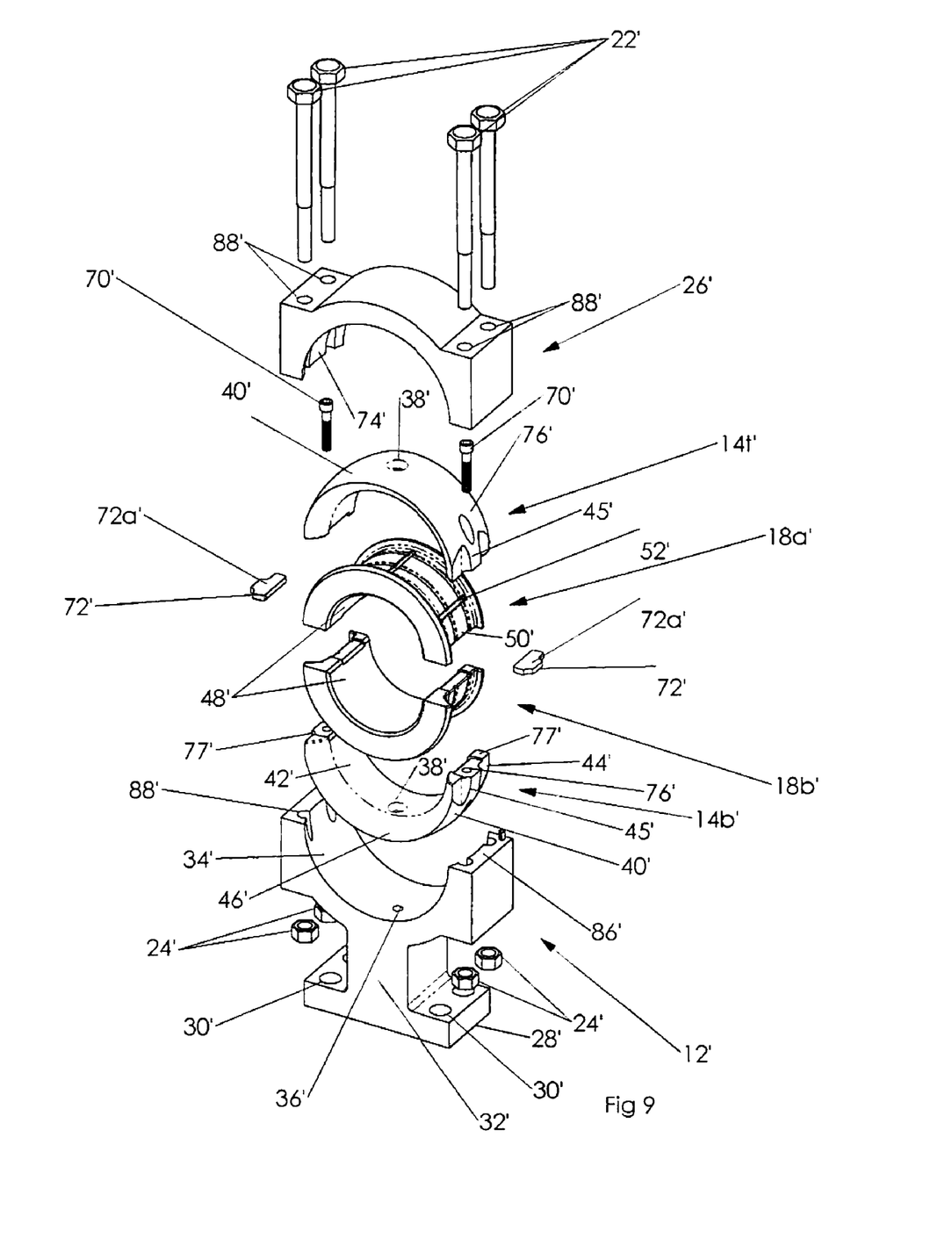
FIG. 9 is an exploded, perspective view of another embodiment of an auger shaft bearing support made in accordance with the present invention.
Figures 10, 11, 12:
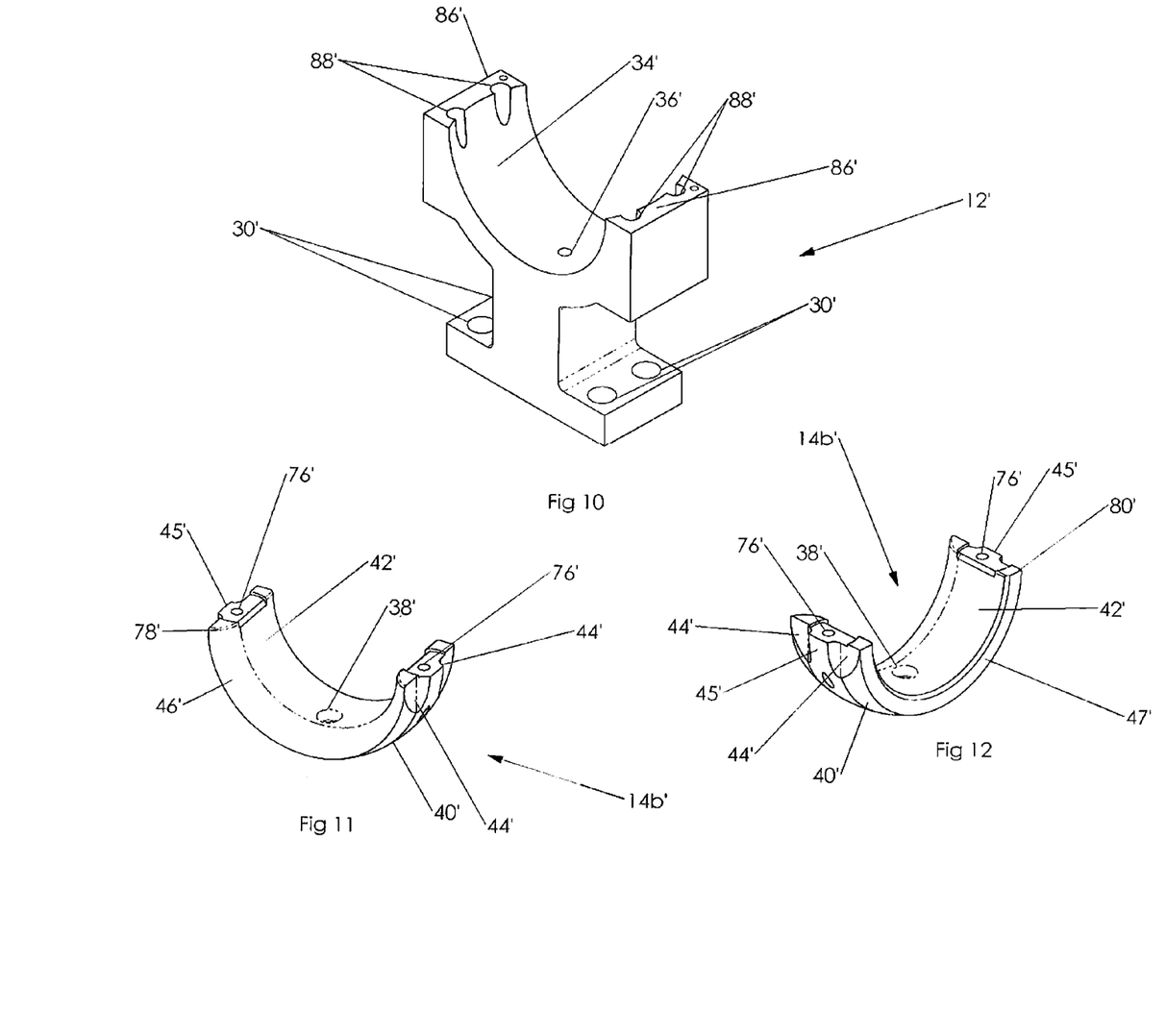
FIG. 10 is a perspective view of the pedestal bearing support of FIG. 9.
FIG. 11 is a perspective view of one half of the outer bearing of FIG. 9.
FIG. 12 is an opposite-end perspective view of the half of the outer bearing of FIG. 11.

Referring to FIG. 10, the pedestal (or housing) 12' is similar to the pedestal 12 of FIG. 4, including a through opening 36' for lubrication of the bearing 10'. This lubrication opening 36' extends from the housing inner surface 34' to a housing outer surface along a diameter which passes through the longitudinal axis of the bearing support 10'. However, the internal surface 34' has a reverse-partial-spherical saddle profile, instead of the cylindrically-shaped saddle 34 of the earlier embodiment 10. Similarly, the corresponding internal surface 74' of the pedestal cover 26' (See FIG. 9) also has a reverse-partial-spherical saddle profile.

A pedestal cover (or housing cover) 26' is substantially identical to the pedestal 12' (excluding the vertical web 32' and the flat base 28' of the pedestal 12'), and this pedestal cover 26' may or may not have a lubrication opening (no lubrication opening shown in FIG. 9). Both the pedestal 12' and its cover 26' end in substantially planar edges 86' lying along a plane extending through the longitudinal axis of the bearing support 10' and through a second diameter at right angles to the diameter defined by the lubrication opening 36'. Both the pedestal 12' and its cover 26' define housing-securement openings 88' extending parallel to the diameter defined by the lubrication opening 36' and extending from the outer surface of the pedestal 12' or cover 26' to its respective planar edge 86'.

Referring now to FIGS. 11 and 12, the lower-half outer bearing 14b' defines a partial spherical outer surface 40' (which, when assembled, rests on the reverse-partial-spherical saddle 34' of the bearing pedestal 12'), and a cylindrical inner surface 42' upon which, when assembled, the cylindrical inner bearing halves 18a', 18b' rotate, as discussed in more detail below. The lower-half outer bearing 14b' defines a through lubrication opening 38', located so as to align with the lubrication passage 36' in the bearing pedestal 12' such that lubricant may be injected from outside of the auger shaft bearing support 10' and reach through the lubrication passage 36' in the bearing pedestal 12' and through the through opening 38' in the outer bearing 14'.

The lower-half outer bearing 14b' also defines flats 44' to prevent rotation of the outer bearing 14', as described below. When assembled, the cap bolts 22' press against these flats 44' to lock the outer bearing 14' between the bearing pedestal 12' and its cover 26', and to prevent rotation of the outer bearing 14'. It should be noted that between the flats 44', there is a projection 45' such that, when assembled, the cap bolts 22' straddle the projection 45'. There is a clearance between the cap bolts 22' and the projection 45' which may allow some axial movement of the outer bearing halves 14b', 14t', inner bearing halves 18a', 18b', and auger shaft 60 assembly relative to the pedestal 12'. However, the reverse-partial-spherical saddle profile of the inner surface 34' of the pedestal 12' prevents any such axial motion of the outer bearing. On the other hand, this combination of the clearance between the cap bolts 22' and the projection 45' which they straddle, and the reverse-partial-spherical saddle profile of the inner surface 34' of the pedestal 12' does allow for an oscillation (or rocking motion) of the outer bearing relative to the pedestal 12'. This is an interesting feature which, in combination with the generously radiused thrust face 46' of the outer bearing, promotes automatic radial centering of the outer bearing relative to the inner bearing as described in more detail later.

The outer bearing halves 14b', 14t' define aligned threaded openings 76', which enable them to be assembled together using the assembly bolts 70'. Spacers 72' fit into recesses in the substantially planar edges 77' at the ends of the outer bearing halves and are sandwiched between the ends of the upper and lower outer bearing halves 14t', 14b' to form a complete outer bearing assembly 14' with a known and true circular shape as described in more detail below. The spacers 72' also have securement openings 72a' through which the assembly bolts 70' pass.

Finally, the axial edges of the interior surface of the upper and lower outer bearing halves 14t', 14b' define forward and rear thrust faces 46', 47' (See FIGS. 11 and 12) which engage the corresponding forward and rear thrust faces 82', 84' of the inner bearing halves 18a', 18b' as described in more detail below. It should be noted that, in this embodiment, the forward thrust face 46' has a wider surface and a radiused profile 78' (See FIG. 11), in contrast with the rear thrust face 47' which has a narrower, axially-aligned surface and a flat profile 80' (See FIG. 12). Notice too that the forward thrust face 46' has some components which are substantially parallel to, and some components which are substantially perpendicular to, the axial direction of the outer bearing halves 14a', 14b'.

When assembled, the outer bearing 14' has inner and outer surfaces 42', 40' which are symmetrical about a longitudinal axis. As has already been described, this outer bearing 14' has first and second diametrically oriented and diametrically opposed central lubrication openings 38'. These lubrication openings 38' extend from the inner surface 42' to the outer surface 40' along a diameter which passes through the longitudinal axis of the bearing support 10'. Note, however, that the outer bearing 14' may have only one of these lubrication openings 38', which is ideally, but not necessarily, centrally located relative to the longitudinal axis of the outer bearing 14'.

As has already been noted, the outer bearing 14' also defines forward and rear thrust faces 46', 47' respectively, wherein the forward thrust face 46' has a generously radiused (or arcuate) contour. Each outer bearing half 14b', 14t' ends in substantially planar edges 77' lying along a plane extending through the longitudinal axis and through a second diameter at right angles to the diameter defined by the lubrication opening 38'. As has also already been described, each outer bearing half 14b', 14t' defines first and second outer-bearing-securement openings 76' extending parallel to the diameter defined by the lubrication opening 38' and extending from the outer surface 40' to its respective planar edge 77'. These outer-bearing-securement openings 76' may be at least partially internally threaded such that the assembly bolts 70' may be threaded to secure the outer bearing assembly 14'. As has also already been noted, the outer bearing assembly 14' may also include one or more spacers or inserts 72', wherein each insert defines an insert securement through opening 72a' which aligns with the outer-bearing-securement opening 76'.

As explained in more detail below, the forward thrust face 46' is designed to take the larger thrust load, while the rear thrust face 47' is designed to keep the bearing from falling out in that direction. This design allows the bearing 10' to maximize the surface area available to carry radial loads by maximizing the surface area 42' of the outer bearing halves 14t', 14b', given the overall width constraints of the bearing support 10'.

In other words, given a maximum overall width of the outer bearing halves in the front-to-rear (or axial) direction, if both forward and rear thrust faces 46' and 47' were generously radiused, then the surface area 42' available for carrying radial loads would be less than if both thrust faces 46' and 47' had no radius at all (that is, if they both had the flat profile of the thrust face 47'). On the other hand, if both thrust faces 46' and 47' had a flat profile in order to provide a greater surface area 42' for carrying radial loads, then the thrust bearing capability of the bearing 10' would be reduced, and there would be no radially-self-centering characteristic of the outer bearing 14' relative to the inner bearing 18' (as described below).

The outer bearing 14' is unable to rotate relative to the housing (pedestal) 12' because the cap bolts 22' abut the flats 44'. However, the partial-spherical outer surface 40' of the outer bearing 14' is able to rock (or oscillate) relative to the reverse-partial-spherical surface 34' of the housing 12', at least to the extent that there is a clearance between the cap bolts 22' and the projection 45' which is straddled by the cap bolts 22'. That is, the outer bearing 14' can pivot relative to the pedestal 12' and cover 26', like a ball in a socket, within the confines allowed by the cap bolts 22' straddling the projection 45'. Therefore, if there is some misalignment between the shaft (and therefore also between the inner bearing 18' which is secured to the shaft) and the housing 12', the outer bearing 18' can pivot (oscillate) to account for some, if not all, of the misalignment. The generously radiused thrust face 46' of the outer bearing in contact with the similarly profiled thrust face 82' of the inner bearing 18' promotes this automatic radial centering of the outer bearing relative to the inner bearing.

As was the case for the previously described bearing 10, the lower-half outer bearing 14b' and the upper-half outer bearing 14t' are identical, each terminating along a horizontal planar surface 77'. When those horizontal planar surfaces 77' are joined together, and including the spacers 72', they form the outer bearing, which, in this embodiment, is made from spinodal bronze with a Rockwell hardness of between 28 C and 32 C. The spacers or inserts 72' permit some compensation for tolerances in the dimensions of the outer bearing halves 14t', 14b' to ensure that the outer bearing forms a true, known diameter for rotational support of the inner bearing.

Figure 13:
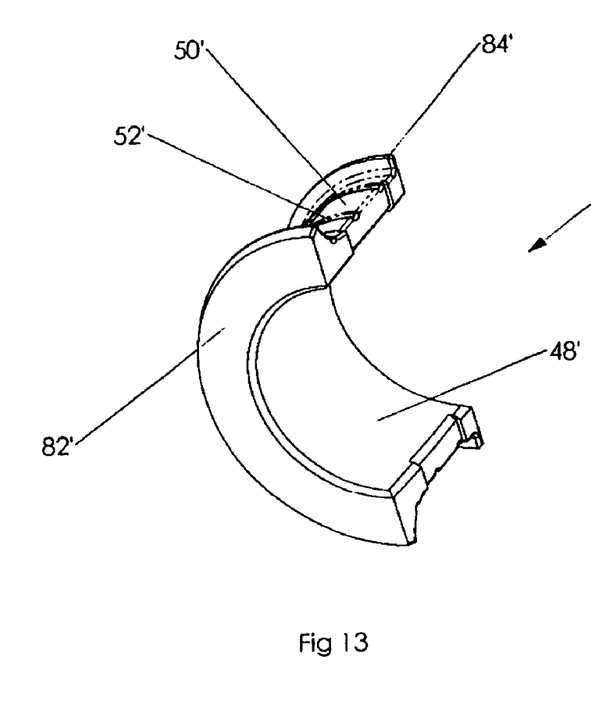
FIG. 13 is a perspective view of one half of the inner bearing of FIG. 9.
Figure 14:
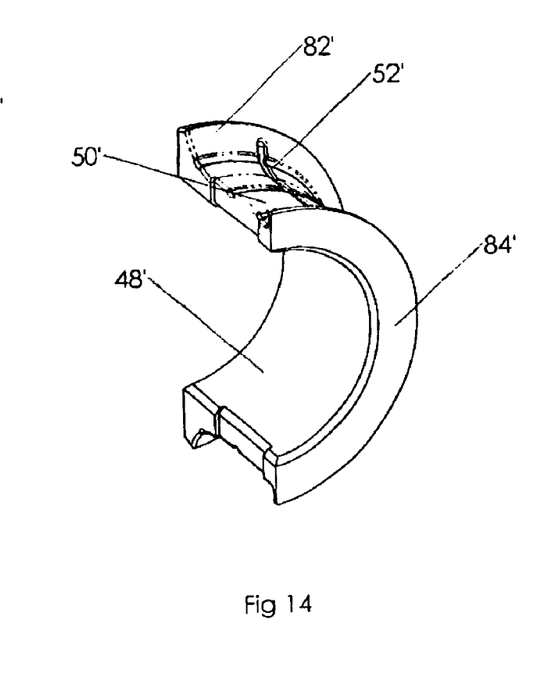
FIG. 14 is an opposite-end perspective view of the half of the inner bearing of FIG. 13.

Referring now to FIGS. 13 and 14, the upper inner bearing half 18a' (which is identical to the lower inner bearing half 18b') defines a semi-cylindrical inner surface 48' (which wraps around and is secured, as by welding, to the rotating shaft 60), and a semi-cylindrical outer surface 50' which rotates against the similarly shaped cylindrical inner surface 42' of the outer bearing halves 14t', 14b'. These inner and outer surfaces 48', 50' are symmetrical about the longitudinal axis of the bearing support 10'.

The cylindrical outer surface 50' defines a plurality of lubrication grooves 52' which are aligned with, and/or are in fluid communication with the through opening 38' in the respective outer bearing half 14t', 14b' at least once during each complete rotation of the inner bearing 18' relative to the outer bearing 14'. The lubricant which is injected through the lubrication passage 36' passes through at least one of the through openings 38' in the outer bearing halves 14t', 14b' and into the lubrication grooves 52'. The lubricant travels via the lubrication grooves 52' to effectively lubricate the interface between the cylindrical inner surface 42' of the outer bearing halves 14t', 14b' and the cylindrical outer surface 50' of the inner bearing halves 18a', 18b'.

Each inner bearing half 18a', 18b' defines forward and rear circumferential thrust flanges 82', 84'. The forward circumferential thrust flange 82' has a generously radiused arcuate contour, which matches the similar generously radiused arcuate contour forward thrust face 46' of the respective outer bearing half 14t', 14b'. The rear circumferential thrust flange 84' has a short and flat profile, which matches the similar flat profiled rear thrust face 47' of the respective outer bearing half 14t', 14b'.

As alluded to earlier, the generously radiused forward thrust face 46' of the outer bearing not only makes a larger surface available for carrying axial thrust loads; it also acts to automatically keep the outer bearing halves 14t', 14b' radially centered with respect to the inner bearing halves 18a', 18b', regardless of the amount of wear on the forward thrust face 46', ensuring longer lasting wear characteristics of the bearing 10'.

Any combination of radial and thrust loads imparted by the shaft to the inner bearing 18' is transferred to the outer bearing 14' and the pedestal 12'. The outer bearing 14' oscillates (rocks or pivots) to align itself with the shaft, urged to do so by the centering action of the generously radiused thrust face 82' of the inner bearing 18' acting against the correspondingly generously radiused thrust face 46' of the outer bearing 14'.

The upper and lower inner bearing halves 18a', 18b' are identical, each terminating in a substantially planar surface. When the planar surfaces are joined together, they form the inner bearing 18' which, in one preferred embodiment, is made from a heat treated, low alloy steel. The inner bearing 18' may be flash chrome plated to increase its hardness to approximately 60 C in the Rockwell hardness scale. Additionally, the outer surface 50' of the inner bearing 18' may be polymer-coated to seal any pores or micro-cavities.

The assembly of this auger bearing support 10' is similar to that of the previously described auger bearing support 10, except for two differences. In this instance, there is an additional step of assembling the spacers 72' to the upper and lower outer bearing halves 14t', 14b' using the assembly bolts 70'. Note that the spacers 72' are not strictly required for the proper operation of this embodiment. Their purpose is to accommodate tolerances in manufacture of the parts in order to ensure a truly circular inner profile. The second additional step in the assembly of this bearing 10' is that care should be exercised to ensure that the bearing 10', which is radially asymmetrical, is assembled onto the auger shaft 60 such that any operational thrust loads are taken up by the thrust faces 46', 82' of the corresponding bearings 14', 18'.

It will be obvious to those skilled in the art that modifications may be made to the embodiments described above without departing from the scope of the present invention as claimed.

What is claimed is:

1. A support for the shaft of a high wall mining machine, comprising:
    an outer bearing, defining a cylindrical inner surface and a partial spherical outer surface, said inner and outer surfaces being symmetrical about a longitudinal axis;
    said outer bearing also defining at least one diametrically oriented lubrication opening extending from said inner surface to said outer surface along a first diameter;
    said outer bearing also defining forward and rear thrust surfaces for supporting loads in the direction of said longitudinal axis, said forward thrust surface having an arcuate contour;
    wherein said outer bearing comprises first and second outer bearing halves which are substantially mirror images of each other;
    each outer bearing half defining:
    first and second substantially planar edges lying along a plane extending through said longitudinal axis and through a second diameter at right angles to said first diameter;
    a first outer-bearing-securement opening extending parallel to said first diameter from the outer surface to the respective first planar edge; and
    a second outer-bearing-securement opening extending parallel to said first diameter from the outer surface to the respective second substantially planar edge, wherein the first outer-bearing-securement opening of the first bearing half is aligned with the second outer-bearing-securement opening of the second bearing half at a first aligned pair of planar edges, and the first outer-bearing-securement opening of the second bearing half is aligned with the second outer-bearing-securement opening of the first bearing half at a second aligned pair of planar edges.

2. A support for the shaft of a high wall mining machine as recited in claim 1, wherein each of said first and second substantially planar edges defines a recess, and further comprising first and second inserts, said first insert being received in the recesses between the first aligned pair of first and second planar edges, and the second insert being received in the recesses between the second aligned pair of first and second planar edges, wherein said inserts define insert-securement openings aligned with the respective outer-bearing-securement openings extending through their respective planar edges.

3. A support for the shaft of a high wall mining machine as recited in claim 2, wherein said outer-bearing-securement openings are at least partially internally threaded.

4. A support for the shaft of a high wall mining machine as recited in claim 3, said rear thrust surface including a planar surface.

5. A support for the shaft of a high wall mining machine as recited in claim 4, each outer bearing half defining at least one anti-rotation flat.

6. A support for the shaft of a high wall mining machine as recited in claim 5, and further comprising:
    an inner bearing rotatably supported inside said outer bearing, said inner bearing defining a cylindrical inner surface and a cylindrical outer surface, said inner bearing inner and outer surfaces being symmetrical about said longitudinal axis; said inner bearing outer surface defining a plurality of lubrication grooves, wherein at least one of said grooves is in fluid communication with said diametrically oriented opening of said outer bearing at least once during each complete rotation of said inner bearing about said longitudinal axis within said outer bearing.

7. A support for the shaft of a high wall mining machine as recited in claim 6, said inner bearing also defining forward and rear thrust surfaces for supporting loads in the direction of said longitudinal axis, said inner-bearing-forward-thrust surface having an arcuate complementing said arcuate contour of said outer-bearing-forward-thrust surface; and wherein said inner bearing comprises first and second inner bearing halves which are substantially mirror images of each other.

8. A support for the shaft of a high wall mining machine as recited in claim 7, and further comprising:
    a housing defining a reverse-partial-spherical-inner surface for oscillatingly supporting said inner bearing, and a housing outer surface;
    said housing also defining at least one diametrically oriented lubrication opening extending from said housing inner surface to said housing outer surface along said first diameter;
    wherein said housing comprises first and second housing halves;

each housing half defining:
  third and fourth substantially planar edges lying along a plane extending through said longitudinal axis and through said second diameter at right angles to said first diameter;
  a first housing-securement opening extending parallel to said first diameter from the housing outer surface to the respective third planar edge; and
  a second housing-securement opening extending parallel to said first diameter from the outer surface to the respective fourth substantially planar edge, wherein the first housing-securement opening of the first housing half is aligned with the second housing-securement opening of the second housing half at a first aligned pair of planar edges, and the first housing-securement opening of the second housing half is aligned with the second housing-securement opening of the first housing half at a second aligned pair of planar edges.

9. A support for the shaft of a high wall mining machine as recited in claim 8, and further comprising cap screws, each cap screw extending through at least one housing-securement opening and contacting at least one of said anti-rotation flats of said outer bearing.

10. A support for the shaft of a high wall mining machine as recited in claim 9, and further comprising a shaft mounted for rotation about said outer bearing, said shaft fixedly secured to said inner bearing.

11. An auger shaft bearing support for use in auger cars used in high wall mining, comprising:
  an axially split inner bearing including at least first and second inner bearing portions each having an inner surface defining a radial direction for mounting to the auger shaft and an outer surface;
  an axially split outer bearing including at least first and second outer bearing portions, each having an inner surface with a profile which closely matches and provides rotational support for said outer surface of said inner bearing;
  wherein said inner bearing is harder than said outer bearing, is made from a heat treated low alloy steel and has a Rockwell hardness of at least 50 C and is polymer-coated, and said outer bearing is made from spinodal bronze with a Rockwell hardness of approximately 30 C; and
  a bearing housing including at least first and second housing portions defining a saddle which supports said outer bearing, said saddle having a partial-reverse-spherical contour.

12. An auger shaft bearing support for use in auger cars used in high wall mining, comprising:
  an axially split inner bearing including at least first and second inner bearing portions each having an inner surface defining a radial direction for mounting to the auger shaft and an outer surface;
  an axially split outer bearing including at least first and second outer bearing portions, each having an inner surface with a profile which closely matches and provides rotational support for said outer surface of said inner bearing, wherein said inner surface of said inner bearing portion is cylindrically-profiled, said outer surface of said inner bearing is cylindrically-profiled, said inner surface of said outer bearing is cylindrically-profiled, and said outer surface of said outer bearing is partial-spherically-profiled; and
  a bearing housing including at least first and second housing portions defining a saddle which supports said outer bearing, said saddle having a partial-reverse-spherical contour.

13. An auger shaft bearing support for use in auger cars used in high wall mining as recited in claim 12, wherein each of said outer bearing portions further defines at least one thrust load-receiving face.

* * * * *